(12) United States Patent  
Cheung

(10) Patent No.: US 9,508,490 B2  
(45) Date of Patent: *Nov. 29, 2016

(54) ELECTRONIC COMPONENT FABRICATION METHOD USING REMOVABLE SPACERS

(71) Applicant: YEN TECHNOLOGIES, LLC, Wilmington, DE (US)

(72) Inventor: William S. H. Cheung, London (GB)

(73) Assignee: YEN TECHNOLOGIES, LLC, Wilmington, DE (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/261,728

(22) Filed: Apr. 25, 2014

(65) Prior Publication Data

US 2014/0233151 A1   Aug. 21, 2014

Related U.S. Application Data

(60) Division of application No. 13/443,286, filed on Apr. 10, 2012, now Pat. No. 8,732,925, which is a division of application No. 12/692,122, filed on Jan. 22, 2010, now Pat. No. 8,156,622, which is a division of application No. 12/029,702, filed on Feb. 12, 2008, now Pat. No. 7,813,105, which is a continuation-in-part of application No. 11/422,451, filed on Jun. 6, 2006, now Pat. No. 7,387,928.

(51) Int. Cl.
    *H01G 4/02*    (2006.01)
    *H01G 2/10*    (2006.01)
    *H01G 4/30*    (2006.01)

(52) U.S. Cl.
    CPC .............. *H01G 4/02* (2013.01); *H01G 2/103* (2013.01); *H01G 4/30* (2013.01); *Y10T 29/41* (2015.01); *Y10T 29/43* (2015.01); *Y10T 29/435* (2015.01); *Y10T 29/49155* (2015.01); *Y10T 29/49171* (2015.01); *Y10T 156/10* (2015.01); *Y10T 156/16* (2015.01); *Y10T 156/1702* (2015.01)

(58) Field of Classification Search
    CPC ....................................................... H01G 4/02
    USPC ....................................................... 361/326
    See application file for complete search history.

(56) References Cited

U.S. PATENT DOCUMENTS

| 1,905,264 A | 4/1933 | Campbell et al. |
| 2,221,671 A | 11/1940 | Cooper |

(Continued)

OTHER PUBLICATIONS

Ex parte Quayle Action on U.S. Appl. No. 13/443,286, mailed Oct. 31, 2013.

(Continued)

*Primary Examiner* — Eric Thomas

(57) ABSTRACT

An electronic component and method for manufacture thereof is disclosed. A plurality of electrodes are positioned in stacked relation to form an electrode stack. The stack may include as few as two electrodes, but more may be used depending on the number of subcomponents desired. Spacing between adjacent electrodes is determined by removable spacers during fabrication. The resulting space between adjacent electrodes is substantially filled with gaseous matter, which may be an actual gaseous fill, air, or a reduced pressure gas formed through evacuation of the space. Further, adjacent electrodes are bonded together to maintain the spacing. A casing is formed to encapsulate the stack, with first and second conducting surfaces remaining exposed outside the casing. The first conducting surface is electrically coupled to a first of the electrodes, and the second conducting surface is electrically coupled to a second of the electrodes.

8 Claims, 6 Drawing Sheets

(56) References Cited

U.S. PATENT DOCUMENTS

| | | | |
|---|---|---|---|
| 3,377,852 | A | 4/1968 | Leistra |
| 3,727,117 | A | 4/1973 | Robinson |
| 4,385,342 | A | 5/1983 | Puppolo et al. |
| 4,571,662 | A | 2/1986 | Conquest et al. |
| 5,162,972 | A | 11/1992 | Gripshover et al. |
| 5,321,989 | A | 6/1994 | Zimmer et al. |
| 5,344,523 | A | 9/1994 | Fung et al. |
| 5,457,598 | A | 10/1995 | Radford et al. |
| 5,479,700 | A | 1/1996 | Nachlas et al. |
| 5,606,486 | A | 2/1997 | Moncrieff |
| 6,256,873 | B1 | 7/2001 | Tiffany, III |
| 6,775,124 | B2 | 8/2004 | Cheung |
| 6,876,123 | B2 | 4/2005 | Martinovsky et al. |
| 7,387,928 | B2 | 6/2008 | Cheung |
| 7,404,829 | B1 | 7/2008 | Feger et al. |
| 7,813,105 | B2 | 10/2010 | Cheung |
| 7,886,414 | B2 | 2/2011 | Kim et al. |
| 8,156,622 | B2 | 4/2012 | Cheung |
| 2004/0087062 | A1 | 5/2004 | Ohuchi |
| 2004/0154911 | A1 | 8/2004 | Burgess et al. |

OTHER PUBLICATIONS

Ex-Parte Quayle Action issued on U.S. Appl. No. 12/692,122, mailed Aug. 29, 2011.

Final Office Action on U.S. Appl. No. 13/443,286, mailed May 16, 2013.

Non-final Office Action issued in U.S. Appl. No. 12/029,702 and mailed Dec. 8, 2009.

Non-Final Office Action on U.S. Appl. No. 12/692,122, mailed Apr. 1, 2011.

Non-Final Office Action on U.S. Appl. No. 13/443,286, mailed Dec. 31, 2012.

Notice of Allowance issued in U.S. Appl. No. 11/422,451 and mailed Feb. 11, 2008.

Notice of Allowance issued in U.S. Appl. No. 12/029,702 and mailed Jun. 11, 2010.

Notice of Allowance on U.S. Appl. No. 13/443,286, mailed Jan. 16, 2014.

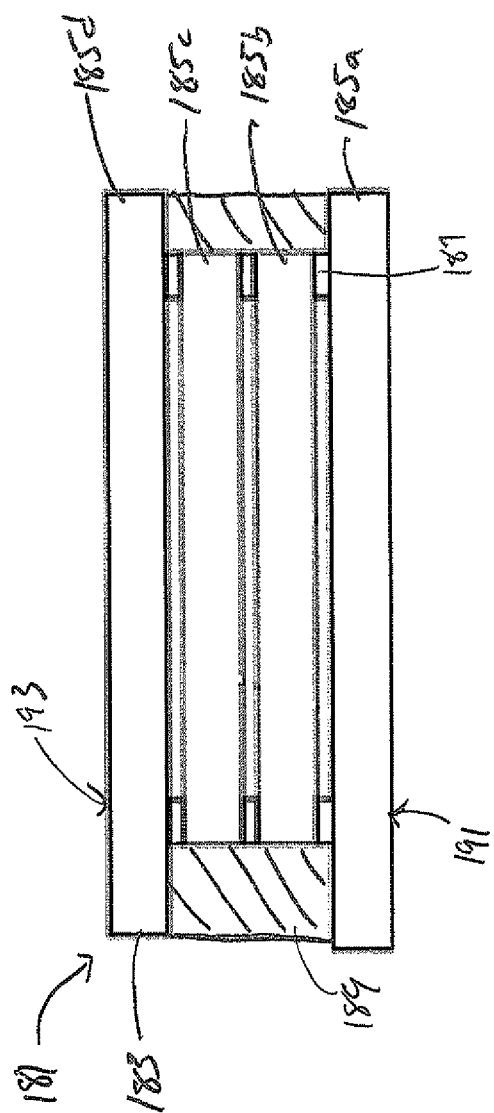

ELECTRONIC COMPONENT FABRICATION METHOD USING REMOVABLE SPACERS

CROSS-REFERENCE TO RELATED PATENT APPLICATIONS

This application is a Divisional of U.S. application Ser. No. 13/443,286, filed Apr. 10, 2012, which is a Divisional of U.S. application Ser. No. 12/692,122, filed Jan. 22, 2010 (now U.S. Pat. No. 8,156,622), which is a Divisional of U.S. application Ser. No. 12/029,702, filed Feb. 12, 2008 (now U.S. Pat. No. 7,813,105), which is a Continuation-In-Part of U.S. application Ser. No. 11/422,451, filed Jun. 6, 2006 (now U.S. Pat. No. 7,387,928), all of which are incorporated herein by reference in their entirety.

FIELD

The field of the present disclosure is electrical capacitors and other components for high frequency and/or microwave circuit applications, particularly multi-layer capacitors capable of high capacitance, high voltage, and operable in high frequency ranges.

BACKGROUND

Radio communication services are becoming so numerous they are reaching the 50 GHz millimeter wave spectrum. As the demand for more telecommunications services increases, and the spectrum becomes increasingly crowded, it is foreseeable that applications in the 50-300 GHz millimeter wave spectrums will be utilized for various telecommunications applications.

Circuits for generating and processing signals in the millimeter wave spectrum present significant challenges to component designers. As the frequencies increase, the quality of the components becomes increasingly difficult to maintain. Specifically, for a basic capacitor utilized in circuits operating at these frequencies, the internal equivalent series resistance (ESR) increases significantly using known dielectrics and construction techniques for microwave capacitors. Upper frequency spectrum applications in UHF (300 MHz to 3.0 GHz) to SHF (3 GHz to 300 GHz) are limited because dielectric materials used in the capacitors exhibit a significant change in ESR with frequency. As the frequency increases for a typical high frequency capacitor, the ESR can increase from 0.05 ohm at 200 MHz to significantly higher ESR and higher losses can be expected. Additionally, the dielectric constant .di-elect cons. also changes as frequencies increase. Thus, capacitors in particular have a practical upper limit in UHF to SHF frequency spectrum when they are constructed with conventional dielectric materials.

One of the more advantageous dielectrics is air. Early capacitor designs used in relatively low RF frequency applications (e.g., 100 KHz to 30 MHz) employed air capacitors particularly for high-powered applications. These capacitors were physically large because of the range of the capacitance values (e.g., 20 pF to 800 pF) that are often required to work at lower RF frequencies. However, in order to stand higher working voltages, it is necessary to increase the distance between electrodes. Consequently, the use of air, gas or a vacuum as a dielectric has not seen widespread use outside of the lower RF frequency applications.

Capacitors that utilize air, gas or a vacuum as a dielectric approach the theoretical performance of an ideal capacitor. That is, such capacitors have no losses and a dielectric constant (.di-elect cons.) which remains constant over an extremely wide frequency spectrum up to SHF range (i.e., 3 GHz to 300 GHz). The power factor for low RF frequency gas/vacuum dielectric background art capacitors is low, making them suitable for carrying high current/working voltage levels. In the event of an internal breakdown due to excessive voltage producing a flash over between capacitor electrodes, the dielectric is self-healing. That is, the dielectric is not destroyed or altered as a result of a voltage arc generated between the electrode plates. Further, it is well known with many dielectric materials used in background art capacitor applications, an air, gas or vacuum dielectric will not suffer from aging and degradation in performance over time.

An additional difficulty in using background art capacitor designs at millimeter wavelength frequencies (e.g., Extremely High Frequency (EHF)) is that most of these capacitors have leads with wire length, or an end cap attachment that introduces significant inductance in the circuit, as well as series circuit resistance. In a typical microwave application, the capacitor electrodes are connected by directly bonding or soldering the device to a printed circuit board (PCB) trace. However, even with these connection techniques undesirable series inductance and resistance can be introduced to microwave circuit.

SUMMARY

The present disclosure is directed toward a multi-layer capacitor and method for manufacturing the same. A plurality of electrodes are positioned in stacked relation to form an electrode stack. Spacing between adjacent electrodes is determined by removable spacers during fabrication. The resulting space between adjacent electrodes is substantially filled with gaseous matter, which may be an actual gaseous fill, air, or a reduced pressure gas formed through evacuation of the space. Further, adjacent electrodes are bonded together to maintain the spacing. A casing is formed to encapsulate the stack, with first and second conducting surfaces remaining exposed outside the casing. The first conducting surface is electrically coupled to a first of the electrodes, and the second conducting surface is electrically coupled to a second of the electrodes.

In a first separate aspect of the present disclosure, the stack is formed by two electrodes, each of which includes In a second separate aspect of the present disclosure, the stack is formed by three or more electrodes. Every other electrode in the stack is electrically coupled together, and two of the electrodes which are not electrically coupled together include the two conducting surfaces, respectively, that are exposed outside of the casing.

In a third separate aspect of the present disclosure, the stack is formed by three or more electrodes, and the top and bottom electrodes in the stack include the two conducting surfaces, respectively, that are exposed outside of the casing.

In a fourth separate aspect of the present disclosure, any of the foregoing aspects may be employed in combination.

Accordingly, an improved multi-layer electronic component and method for manufacturing the same are disclosed. Advantages of the improvements will appear from the drawings and the description of the preferred embodiment.

BRIEF DESCRIPTION OF THE DRAWINGS

In the drawings, wherein like reference numerals refer to similar components:

FIG. 15 shows a sectional view of a multi-layer series electrode capacitor.

DETAILED DESCRIPTION OF THE PREFERRED EMBODIMENTS

The fundamental formula for a capacitor having 2 planar parallel electrodes/plates separated by a dielectric material is:

$$C = 0.0885 \in A/d, \quad (1)$$

where C is the capacitance; .di-elect cons. is the dielectric constant; A is the area common to both electrodes; and d is the distance or spacing between the electrodes.

In practice, the dielectric constant .di-elect cons. is determined by the material between the electrodes of the capacitor. Many common dielectric materials used in capacitors designed for lower frequency operations exhibit a significant change in dielectric constant .di-elect cons. as well as higher losses as the frequency increases. That is, the value of the dielectric constant .di-elect cons. is a function of frequency. At low frequencies, having a dielectric material with a high dielectric constant .di-elect cons. produces greater capacitance for the size of the component. At higher frequencies, the internal equivalent series resistance (ESR) and lead inductance losses also increase as frequencies increases and degrades the quality of the capacitive component.

Air has a dielectric constant of 1 which is substantially frequency invariant. Thus, as the frequency of the signal through the capacitor increases, the capacitor exhibits substantially the same capacitance without any significant increases in ESR losses. However, lowering the dielectric constant .di-elect cons. to 1 reduces the capacitance value obtainable for a capacitor of a given size. Alternatively, capacitances in the range of 0.5-100 pF can be achieved using a gas dielectric or a vacuum dielectric at millimeter wavelengths.

As an example, typical capacitors for use in the millimeter wave frequency range may have a common electrode surface area A and spacing d as shown in TABLE 1.

TABLE 1

| | | Spacer Size | | | | |
|---|---|---|---|---|---|---|
| | | 3 | 5 | 6 | 8 | 10 (micron) |
| Electrode | 5 × 5 mm | 73.73 | 44.25 | 56.88 | 27.66 | 22.13 (pF) |
| Size | 4 × 4 | 47.20 | 28.30 | 23.60 | 17.70 | 14.16 |
| | 3 × 3 | 26.55 | 15.93 | 13.28 | 9.96 | 7.98 |
| | 2 × 2 | 11.8 | 7.08 | 5.90 | 4.43 | 3.54 |
| | 1 × 1 | 2.95 | 1.77 | 1.48 | 1.11 | 0.89 |

The top line of TABLE 1 shows spacing between electrodes of 3, 5, 6, 8 and 10 microns. For the given spacing between electrodes and with an air dielectric, the capacitor electrode size is also shown in TABLE 1. For instance, square capacitor structures between 1.times.1 mm and 5.times.5 mm are shown with values of capacitance from 0.89 pF-73.73 pF, respectively.

Figure 1:
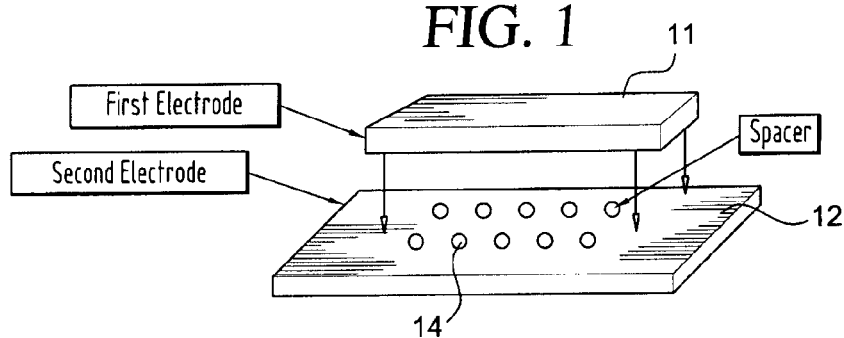
FIG. 1 shows a first process step of positioning two electrodes for forming a capacitor.

Referring now to FIG. 1, the relative positioning between the first electrode 11 and second electrode 12 are shown. In the exemplary embodiment of FIG. 1, first electrode 11 is rectangular in shape, as is second electrode 12. In addition, first electrode 11 is smaller in length and width than second electrode 12. However, the present invention is not limited to electrodes of a specific shape or size.

As shown in FIG. 1, the two electrodes are maintained at a constant distance apart by a plurality of micro-sphere spacers 14. However, the spacers may comprise any shape, size or material that can be used to provide the spacing d between the first electrode and second electrode with common area A in order to achieve a desired capacitance C with a dielectric constant .di-elect cons., as discussed above in the capacitance formula (I). TABLE 1 gives exemplary spacers sizes for millimeter wave applications.

Figure 2:
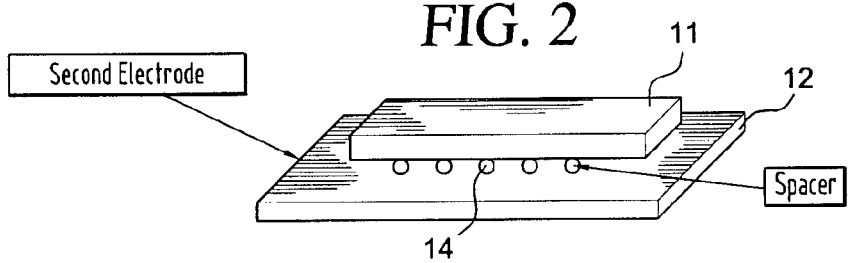
FIG. 2 shows the first electrode and second electrode being brought into facing relationship and separated by spacers.
Figure 3:
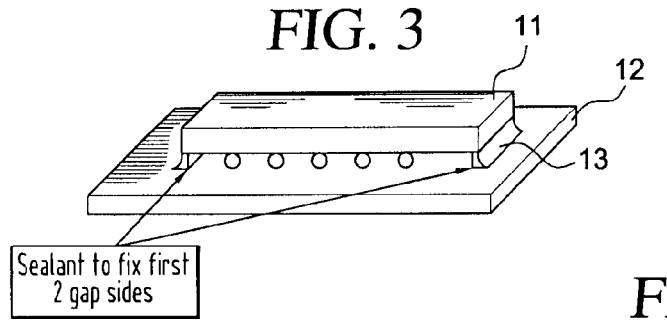
FIG. 3 shows how a plurality of opposite edges of the first electrode are sealed to the second electrode.
Figure 4:
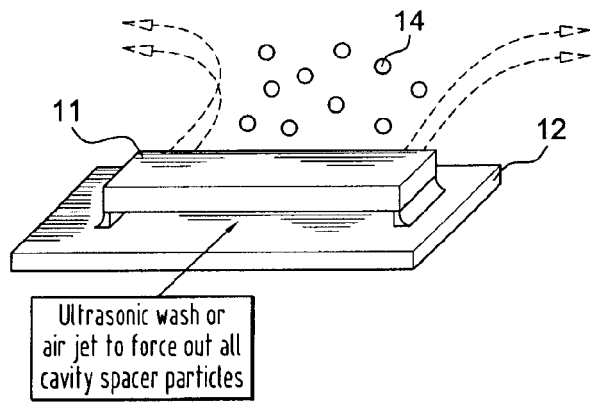
FIG. 4 shows the removal of spacers once the plurality of opposite edges of a first electrode has been fixed to the second electrode.
Figure 5:
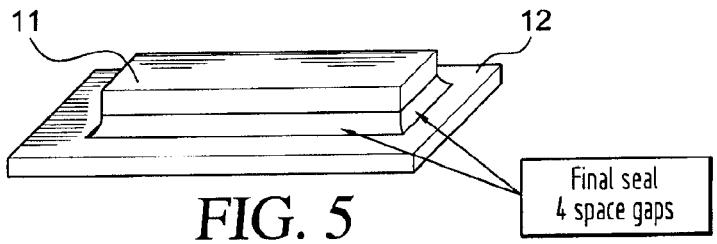
FIG. 5 shows the step of sealing the remaining plurality of edges of the first electrode to the second electrode.

FIG. 2 shows the first electrode 11 and the second electrode 12 being brought into a facing relationship, and separated by the spacers 14. The spacers 14 may be comprised of, but are not limited to: silica material or any other well known materials used to separate electrodes. Once the first electrode 11 and second electrode 12 are spaced appropriately by the spacers 14, the gap between a plurality of opposite edges of the first electrode 11 are bonded to the surface of the second electrode 12 with a sealant 13, as shown in FIG. 3. The silica micro-sphere spacers 14, shown in exemplary FIG. 4, are removed once the sealant 13 hardens fixing the spacing d between the two planer electrodes 11, 12 with respect to each other. The sealant 13 may be an epoxy resin or any other material that both seals and bonds the first electrode 11 and second electrode 12.

As FIG. 4 show, the spacers 14 can be removed so that no material remains between the two planer electrodes 11 and 12. The spacer removal can be performed by, for example, but not limited to: airs jet and electro-sonic wash. Following the removal of the spacers 14, the remaining edges of the first electrode 11 are bonded with sealant to the second electrode 12 so as to form an enclosed case containing air as a dielectric.

Figure 6:
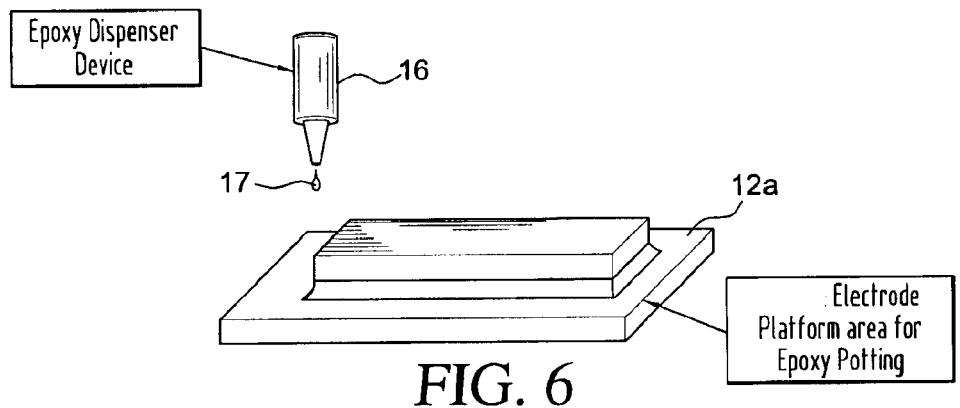
FIG. 6 shows the area above the second electrode and around the periphery of the first electrode.
Figure 7:
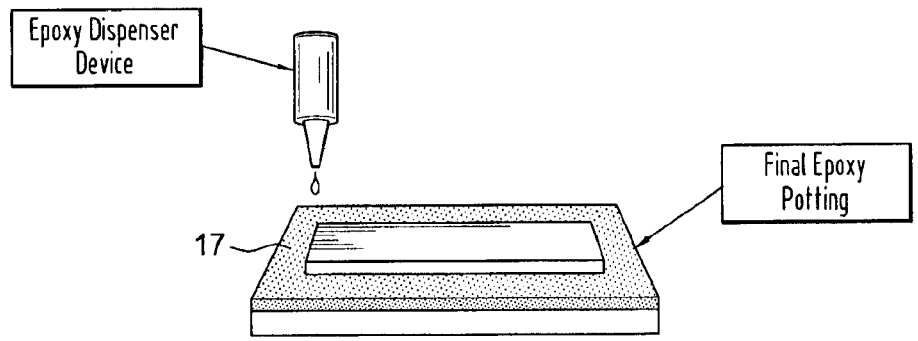
FIG. 7 shows the formation of an epoxy cover around the periphery of the first electrode.

With the first electrode 11 and second electrode 12 bonded together, an additional epoxy cover 17 may be formed over the second electrode 12 and extending around the periphery of the first electrode 11. As shown in FIG. 6, drops of an epoxy potting compound are deposited on the surface of the second electrode 12 outside of the sealed space formed with the first electrode 11. The epoxy dispenser 16 deposits enough epoxy in the area 12a above the second electrode 12 so that a durable final epoxy potting ridge is formed around the first electrode 11, as shown in the side view of FIG. 7.

Figure 8:
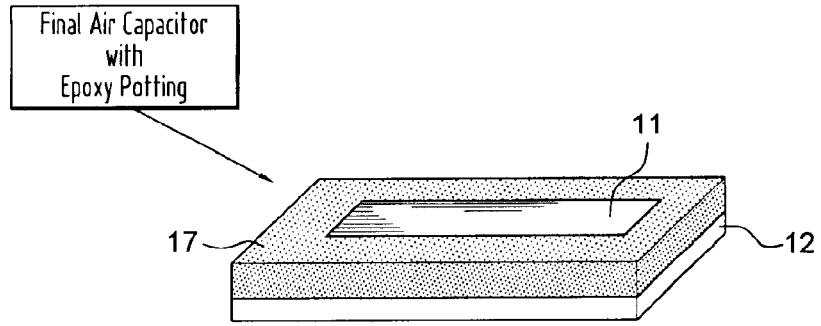
FIG. 8 shows a completed capacitor with the final epoxy cover around the periphery of the first electrode and supported by the second electrode.

As shown in exemplary embodiment of FIG. 8, the finished capacitor has a rectangular configuration with the plurality of sealed edges of the first electrode 11 and second electrode 12 protected by the epoxy cover 17. Electrical connections can be made by electrically connecting the first electrode 11 and second electrode 12 directly to a circuit trace of a circuit board. Examples of means of electrically connecting include, but are not limited to: soldering and bonding.

Figure 9:
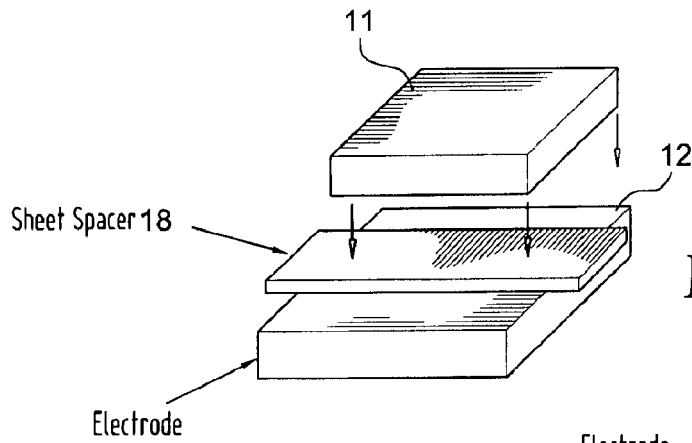
FIG. 9 shows the first electrode and second electrode being brought into facing relationship and separated by a spacer sheet in another embodiment.

FIG. 9 is an exemplary alternative embodiment. As shown in FIG. 9, the two electrodes are maintained at a constant distance apart by a spacer sheet 18. The spacer sheet may comprise any shape, size or material that can be used to provide the spacing d between the first electrode 11 and second electrode 12 with common area A in order to achieve a desired capacitance C with a dielectric constant c, as discussed above in the capacitance formula (I). As discussed above, TABLE 1 gives exemplary spacers sizes for millimeter wave applications.

Figure 10:
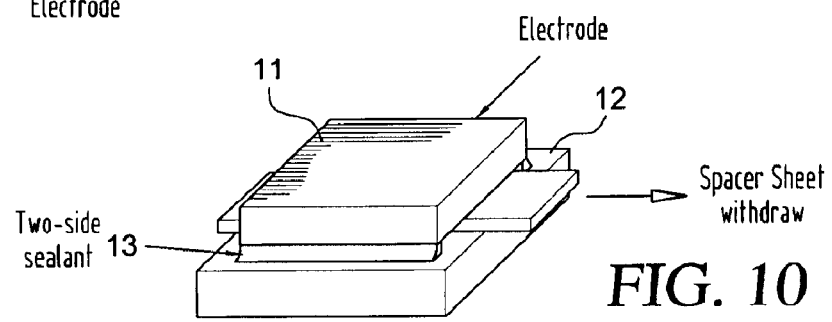
FIG. 10 shows how a plurality of opposite edges of the first electrode are sealed to the second electrode with a sealant and the removal of the spacer sheet.

FIG. 10 shows the first electrode 11 and the second electrode 12 being brought into a facing relationship, and separated by the spacer sheet 18. The spacers 14 may be comprised of, but are not limited to: silica material or any other well known materials that can be used to separate electrodes. Once the first electrode 11 and second electrode 12 are spaced appropriately by the spacer sheet 18, the gap between a plurality of opposite edges of the first electrode 11 are bonded to the surface of the second electrode 12 with a sealant 13, as shown in FIG. 10. The spacer sheet 18, shown in exemplary FIG. 10, is removed once the sealant 13 hardens fixing the spacing d between the two planer electrodes 11, 12 with respect to each other. The sealant 13 may be an epoxy resin or any other material that both seals and provides a desired dielectric constant .di-elect cons.

Figure 11:
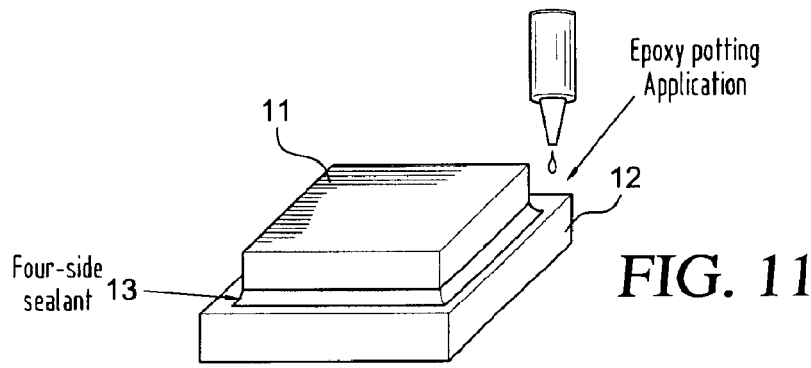
FIG. 11 shows the area above the second electrode and around the periphery of the first electrode subject to epoxy potting that forms an epoxy cover.

As FIG. 11 shows, following the removal of the spacer sheet 18, the remaining plurality of edges of the first electrode 11 are bonded with sealant 13 to the second electrode 12 so as to form an enclosed case containing air as a dielectric.

With the first electrode 11 and second electrode 12 bonded together, an additional epoxy cover 17 may be formed over the second electrode 12 and extending around the periphery of the first electrode 11. As shown in FIG. 11, drops of an epoxy potting compound are deposited on the surface of the second electrode 12 outside of the sealed space formed with the first electrode 11. The epoxy dispenser 16 deposits enough epoxy in the area above the second electrode 12 so that a durable final epoxy potting ridge is formed around the first electrode 11, as shown in the side view of FIG. 12.

Figure 12:
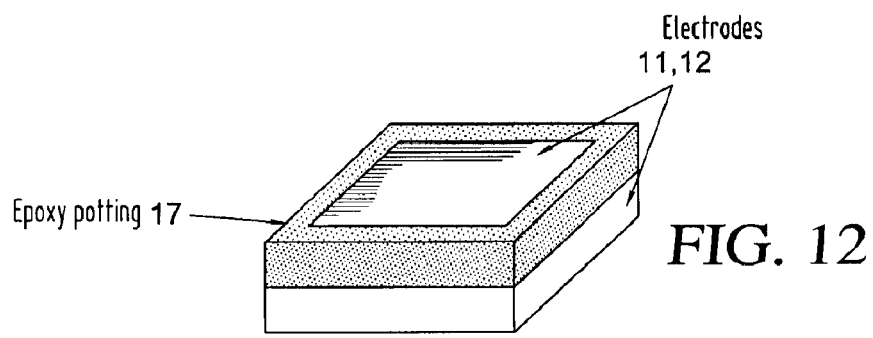
FIG. 12 shows a completed capacitor with the final epoxy cover around the periphery of the first electrode and supported by the second electrode.

As shown in exemplary embodiment of FIG. 12, the finished capacitor has a rectangular configuration with the plurality of sealed edges of the first electrode 11 and second electrode 12 protected by the epoxy cover 17. Electrical connections can be made by electrically connecting the first electrode 11 and second electrode 12 directly to a circuit trace of a circuit board. Examples of means of electrically connecting include, but are not limited to: soldering and bonding.

Figure 13:
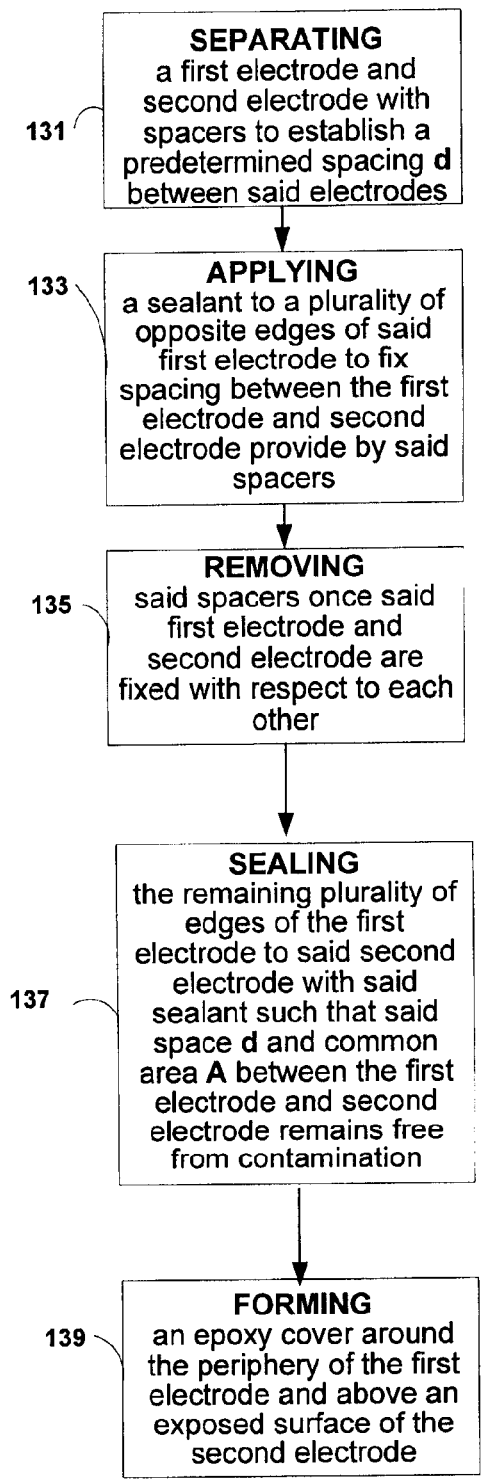
FIG. 13 shows an exemplary flow diagram for a method for making a capacitor.

FIG. 13 shows an exemplary flow diagram for a method for making a capacitor. Step 131 of FIG. 13 is separating a first electrode and second electrode with spacers to establish a predetermined spacing d between said electrodes. In step 133, a sealant is applied to a plurality of opposite edges of said first electrode to fix spacing between the first electrode and second electrode provide by said spacers. Step 135 involves removing the spacers once said first electrode and second electrode are fixed with respect to each other. In step 137, the remaining plurality of edges of the first electrode are sealed to said second electrode with the sealant such that said space d and common area A between the first electrode and second electrode remains free from contamination. Step 139 of FIG. 13 is forming an epoxy cover around the periphery of the first electrode and above an exposed surface of the second electrode. Alternatively, a spacer sheet may be used with the above described method.

In addition, those skilled in the art will recognize that in accordance with U.S. Pat. No. 6,775,124 (i.e., '124 patent), the entire contents of which are incorporated by reference, the above-discussed device and method can provide a vacuum capacitor where a vacuum can be drawn between the space d and area A common to first electrode 11 and second electrode 12 forming a vacuum capacitor with the embodiment discussed above. Alternatively, in accordance with the '124 patent, the above-discussed device and method can provide a gas capacitor where a gas can be inserted within the space d area A common to first electrode 11 and second electrode 12. The alternative embodiments of an air, vacuum or gas vacuum capacitor for the present embodiment are selected to supply an appropriate dielectric constant .di-elect cons. and capacitance value C that provides the required performance in accordance with a desired application.

Figure 14:
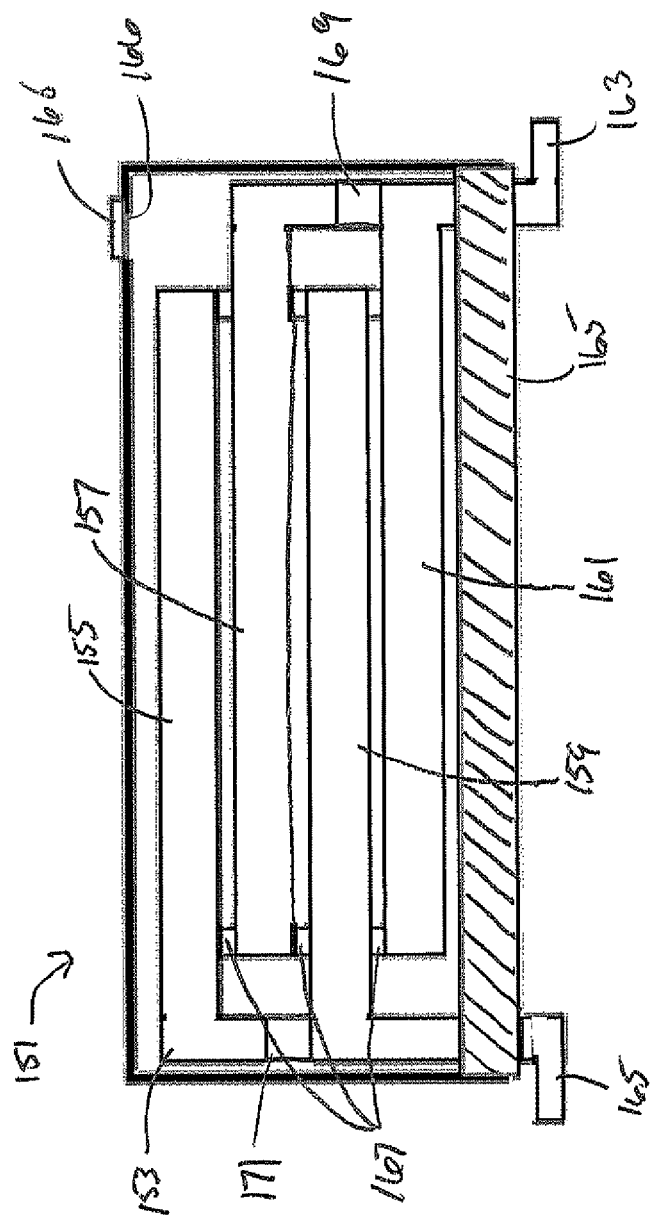
FIG. 14 shows a sectional view of a multi-layer parallel electrode capacitor.

The method for fabricating a two electrode capacitor may be easily adapted and extended to fabricate the multi-electrode capacitor 151 shown in FIG. 14. This capacitor 151 has a stack 153 of four electrodes 155, 157, 159, 161, although more may be included depending upon the desired functional specifications. Spacing between adjacent electrodes in the stack 153 is achieved through the use of removable spacers as described above for a two electrode capacitor. The bottommost electrode 161 in the stack includes a leg 163 which extends to the underside of the encapsulant 165 to facilitate surface mounting of capacitor. Likewise, the next electrode 159 in the stack 153 also includes a leg 165 which extends to the exterior of the encapsulant 161. Bonding adhesive 167 is placed at the corners of the electrodes to maintain spacing between adjacent electrodes, thereby permitting removal of the spacers. Alternatively, bonding adhesive may be placed along multiple edges between the electrodes. In this embodiment, the edges of the electrodes are not completely sealed, but rather the encapsulant 165 seals the entire stack 153. During fabrication of the encapsulant 165, a vent hole 166 is left in a portion of the encapsulant so that gas may be inserted into the spacing between the electrodes, or the volume within the encapsulant may be evacuated. Once the desired fill or vacuum has been created, an epoxy sealant 168 is placed in the vent hole 166 to maintain the fill or vacuum within the encapsulant 165.

Within the stack, every other electrode is electrically coupled by solder joints. As shown, the bottommost electrode 161 is electrically coupled to the third electrode 157 through a first solder joint 169, and the second electrode 159 is coupled to the fourth electrode 155 through a second solder joint 171. Thus, an electrical path is created between each pair of adjacent electrodes such that each pair serves as one of a plurality of capacitors connected in parallel for the circuit into which the stack 153 is incorporated. Following creation of the stack 153, the encapsulant 165 is placed around the entire stack, leaving legs 163, 165 of the two lowest electrodes 161, 159 in the stack 153 exposed. In practice, any portion of any two electrodes may extend outside of the encapsulant.

The multi-layer parallel capacitor 151 described above groups several electrodes together in parallel to achieve a higher capacitance than a two electrode capacitor with the identical electrode area. In addition, the working voltage for the multi-layer capacitor is anticipated to be the same as for a two electrode capacitor, thus providing high operating voltage and high capacitances for use in high frequency circuits in the range of GHz and above.

A second multi-electrode capacitor 181 is shown in FIG. 15. This stack 183 includes four electrodes 185a-185d forming capacitors in series. The spacing between the electrodes is again formed in the same manner as previously described, and the spacing is maintained by a bonding adhesive 187 placed between each pair of adjacent electrodes. An encapsulant 189 is placed about the entire stack and the entire volume within the encapsulant filled with a gas or evacuated as desired, such as is described previously in association with FIG. 14. The encapsulant 189 leaves surfaces 191, 193 exposed on the top and bottom electrodes 185a, 185d so that the multi-layer capacitor 181 may be incorporated into an electronic circuit. Alternatively, the space between each pair of adjacent electrodes may be individually sealed by placing additional bonding adhesive along all of the edges between adjacent electrodes, and the space may be filled with either a gas, air or vacuum. An encapsulant would then is placed about the stack leaving surfaces exposed for electrical connection.

The multi-layer series capacitor 181 described above groups several electrodes together in series to achieve a higher working voltage than a two electrode capacitor with the identical electrode area. In addition, the capacitance for the multi-layer capacitor is anticipated to be the same as for a two electrode capacitor, thus providing a very high operating voltage and high capacitance for use in high frequency circuits in the range of GHz and above.

Beyond capacitors, additional components can be implemented with the device and methods of the present embodiment discussed above. For example, with regard to transmission lines, the present embodiment can be used to implement parallel strips/striplines components with electrodes having an air, gas or vacuum dielectric between the electrodes. As discussed above, since an air dielectric in particular has no practical limitations with respect to RF losses, these transmission line devices may be developed well into the upper GHz frequency spectrum. Thus, the present embodiment can also be used to provide low loss transmission lines well into the high GHz frequency range.

Another application of the present invention is the implementation of transmission stripline impedance matching transformers. For example, the present invention can be used to implement a λ/4 transmission line requiring an impedance $Z_m$. That is, a transmission line can be implemented with the device and methods of the present invention that can be used as an impedance transformer to match $Z_{in}$ to $Z_{out}$. A λ/4 transmission line impedance matching transformer has been implemented in prototype form with the device and methods of the present invention. Yet another application of the above-discussed invention is a microwave low pass filter. In particular, the planar stripline electrodes discussed above can be used as microwave low pass filters with air or vacuum dielectrics between the parallel electrodes.

In addition, to the transmission line applications discussed above, yet another application for the present invention is the implementation of a ring circulator. In particular, a ring circulator is a ring transmission line directional coupler that can be used to sample RF signals that are traveling in different directions inside the ring. A 1.52λ, microwave, 3 dB Hybrid Ring Circulator has been implemented in prototype form using the device and methods of the present invention. The ring circulator is a very useful component for a variety of applications including, but not limited to: signal power splitting; signal combining; and signal mixers.

As yet another example of an application of the present invention, low values of inductors (i.e., 0.1 nH to 0.9 nH) with high Q factor can be produced with the device and methods discussed above. In particular, a λ/8 length transmission line with a short circuit at the far end will resemble an inductor at an open end. The equivalent or virtual inductance of the λ/8 length transmission line at a wavelength ($λ_0$/frequency ($f_0$) of interest is given by the following formula:

$$L = Z_0/(2 * \pi * f_0), \qquad (2)$$

where the inductance is L; the characteristic impedance is $Z_0$; and the frequency of interest is $f_0$ From equation (2), the virtual value of the λ/8 transmission line inductance is a function of the actual line characteristic impedance $Z_0$. That is, by controlling the characteristic line impedance $Z_0$, with the device and methods of the present invention, one can arrive at a desired low inductance value.

As a practical example of the above, if the target low inductance L is 0.2 nH at a frequency of interest $f_0$ of 3 GHz, by using equation (2), the required λ/8 line impedance required create the characteristic line impedance $Z_0$ would be 3.77 ohms. The final inductor, with a characteristic impedance $Z_0$ of only 3.77 ohms, must have a very stable characteristics and not be affected by the circuit surroundings. The device and methods of the present invention provides these characteristics at a wide range of RF frequencies.

As a practical example of the above, if the target low inductance L is 0.2 nH at a frequency of interest $f_0$ of 3 GHz, by using equation (2), the required λ/8 line impedance required create the characteristic line impedance $Z_0$ would be 3.77 ohms. The final inductor, with a characteristic impedance $Z_0$ of only 3.77 ohms, must have a very stable characteristics and not be affected by the circuit surroundings. The device and methods of the present invention provides these characteristics at a wide range of RF frequencies.

The foregoing description of the invention illustrates and describes the present invention. Additionally, the disclosure shows and describes only the preferred embodiments of the invention in the context of an air, gas or vacuum capacitor and method for making an air, gas or vacuum capacitor, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. An electronic component fabricated according to a method, the method comprising:
    placing a plurality of electrodes in a stack, wherein spacing between adjacent electrodes in the stack is determined by one or more removable spacers;
    bonding adjacent electrodes together to fix the spacing;
    removing the one or more removable spacers from between the adjacent electrodes, wherein said removing the one or more removable spacers from between the adjacent electrodes includes removing all spacers that had been placed between the adjacent electrodes prior to said bonding adjacent electrodes together, and wherein the resulting spacing from removing the one or more removable spacers is substantially filled with gaseous matter; and
    encapsulating the stack with a casing, leaving first and second conducting surfaces exposed outside the casing, wherein the first conducting surface is electrically coupled to a first of the plurality of electrodes, and wherein the second conducting surface is electrically coupled to a second of the plurality of electrodes.

2. The method of claim 1, further comprising placing a sealant about a periphery of adjacent electrodes to enclose the resulting spacing.

3. The method of claim 1, wherein the plurality of electrodes in a stack comprises three or more electrodes.

4. The method of claim 3, wherein two of the electrodes are not electrically coupled together and include two conducting surfaces exposed outside of the casing.

5. The method of claim 1, wherein the plurality of electrodes range in size from 1 mm to 5 mm and the resulting spacing ranges in size from 3 to 10 microns.

6. The method of claim 1, wherein the electronic component is a gas capacitor.

7. The method of claim 1, wherein the gaseous matter comprises a reduced pressure gas.

8. The method of claim 1, wherein the spacing between all adjacent electrodes is uniform.

* * * * *